(12) United States Patent
Van Hoecke et al.

(10) Patent No.: US 11,554,690 B2
(45) Date of Patent: Jan. 17, 2023

(54) VEHICLE SEAT OPERATION

(71) Applicant: Ford Global Technologies, LLC, Dearborn, MI (US)

(72) Inventors: Patrick Lawrence Jackson Van Hoecke, Dearborn, MI (US); Omar Makke, Lyno Township, MI (US); Oleg Yurievitch Gusikhin, Commerce Township, MI (US); Hamid M. Golgiri, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 16/616,774

(22) PCT Filed: May 25, 2017

(86) PCT No.: PCT/US2017/034408
§ 371 (c)(1),
(2) Date: Nov. 25, 2019

(87) PCT Pub. No.: WO2018/217205
PCT Pub. Date: Nov. 29, 2018

(65) Prior Publication Data
US 2021/0016687 A1   Jan. 21, 2021

(51) Int. Cl.
*B60N 2/24* (2006.01)
*B60N 2/06* (2006.01)
(Continued)

(52) U.S. Cl.
CPC .............. *B60N 2/06* (2013.01); *B60N 2/242* (2013.01); *B60N 2/002* (2013.01); *B60N 2/0232* (2013.01);
(Continued)

(58) Field of Classification Search
CPC .......... B60N 2/06; B60N 2/242; B60N 2/002; B60N 2/0232; B60N 2002/0256; B60N 2/02; B60N 2002/0268
(Continued)

(56) References Cited

U.S. PATENT DOCUMENTS 5,605,368 A   2/1997   Noma et al.
7,023,108 B2   4/2006   Itami et al.
(Continued)

FOREIGN PATENT DOCUMENTS

DE   102014206507 A1   10/2015
JP   2006117083 A   5/2006
(Continued)

OTHER PUBLICATIONS

First Office Action as issued by the Chinese Patent Office dated Oct. 22, 2021 (in Chinese and English).
(Continued)

*Primary Examiner* — Yazan A Soofi
(74) *Attorney, Agent, or Firm* — Brandon Hicks; Bejin Bieneman PLC

(57) ABSTRACT

A user destination is identified based on received location information from a user. A first seat in a vehicle is assigned to the user based on the user destination. At least one of the first seat and a second seat in the vehicle is moved upon user entry until a distance between the first seat and the second seat is greater than a distance threshold.

18 Claims, 4 Drawing Sheets

(51) Int. Cl.
B60N 2/00 (2006.01)
B60N 2/02 (2006.01)

(52) U.S. Cl.
CPC ................ *B60N 2002/0256* (2013.01); *B60N 2002/0268* (2013.01)

(58) Field of Classification Search
USPC .......................................................... 701/49
See application file for complete search history.

(56) References Cited

U.S. PATENT DOCUMENTS

| | | | |
|---|---|---|---|
| 8,894,031 B2 | 11/2014 | Sailer et al. | |
| 9,227,531 B2 | 1/2016 | Cuddihy et al. | |
| 9,358,940 B2 | 6/2016 | Cooper et al. | |
| 9,611,042 B1* | 4/2017 | Childress | E06B 7/28 |
| 9,633,402 B1* | 4/2017 | McCartney | G06Q 30/0629 |
| 9,805,388 B2* | 10/2017 | Joshi | G06Q 30/0241 |
| 9,815,388 B1* | 11/2017 | Lindsay | B60N 2/0276 |
| 2005/0061914 A1* | 3/2005 | Bishop | B60N 2/01575 |
| | | | 244/118.5 |
| 2007/0265891 A1* | 11/2007 | Guo | G06Q 10/02 |
| | | | 705/5 |
| 2007/0290554 A1 | 12/2007 | Teshima et al. | |
| 2008/0103661 A1* | 5/2008 | Sugimoto | B60Q 1/122 |
| | | | 362/466 |
| 2009/0164073 A1 | 6/2009 | Mabuchi et al. | |
| 2012/0242492 A1* | 9/2012 | Grunfeld | G08B 21/24 |
| | | | 340/667 |
| 2013/0049955 A1* | 2/2013 | Hoover | B60N 2/28 |
| | | | 340/539.11 |
| 2013/0238167 A1* | 9/2013 | Stanfield | E05B 81/56 |
| | | | 701/2 |
| 2014/0277935 A1 | 9/2014 | Daman et al. | |
| 2014/0335902 A1 | 11/2014 | Guba et al. | |
| 2015/0210287 A1* | 7/2015 | Penilla | G06F 3/04842 |
| | | | 701/49 |
| 2016/0042575 A1 | 4/2016 | Ganguly et al. | |
| 2016/0170998 A1* | 6/2016 | Frank | G06F 16/337 |
| | | | 707/748 |
| 2017/0285642 A1* | 10/2017 | Rander | B60N 2/0244 |
| 2018/0039917 A1* | 2/2018 | Buttolo | G06Q 10/0631 |
| 2018/0308202 A1* | 10/2018 | Appu | G06F 9/46 |
| 2019/0263231 A1* | 8/2019 | Jabour | G02F 1/163 |
| 2021/0016687 A1* | 1/2021 | Van Hoecke | B60N 2/242 |
| 2021/0276459 A1* | 9/2021 | Yetukuri | B60N 2/976 |

FOREIGN PATENT DOCUMENTS

| | | |
|---|---|---|
| JP | 2007216920 A | 8/2007 |
| JP | 2013-069085 A | 4/2013 |

OTHER PUBLICATIONS

International Search Report of the International Searching Authority for PCT/US2017/034408 dated Aug. 15, 2017.

\* cited by examiner

VEHICLE SEAT OPERATION

BACKGROUND

Vehicles can transport users to destinations. For example, an autonomous service vehicle can transport a plurality of users to one or more destinations. At each destination, users may enter and exit the vehicle. Space in the vehicle may be lacking for ingress and egress of the users upon arriving at a destination. Current systems lack techniques for actively adjusting positions of seats in the vehicle to accommodate ingress and egress of the users and positioning the users in the vehicle based on their respective destinations to aid in the adjustment of the seats.

DETAILED DESCRIPTION

Figure 1:
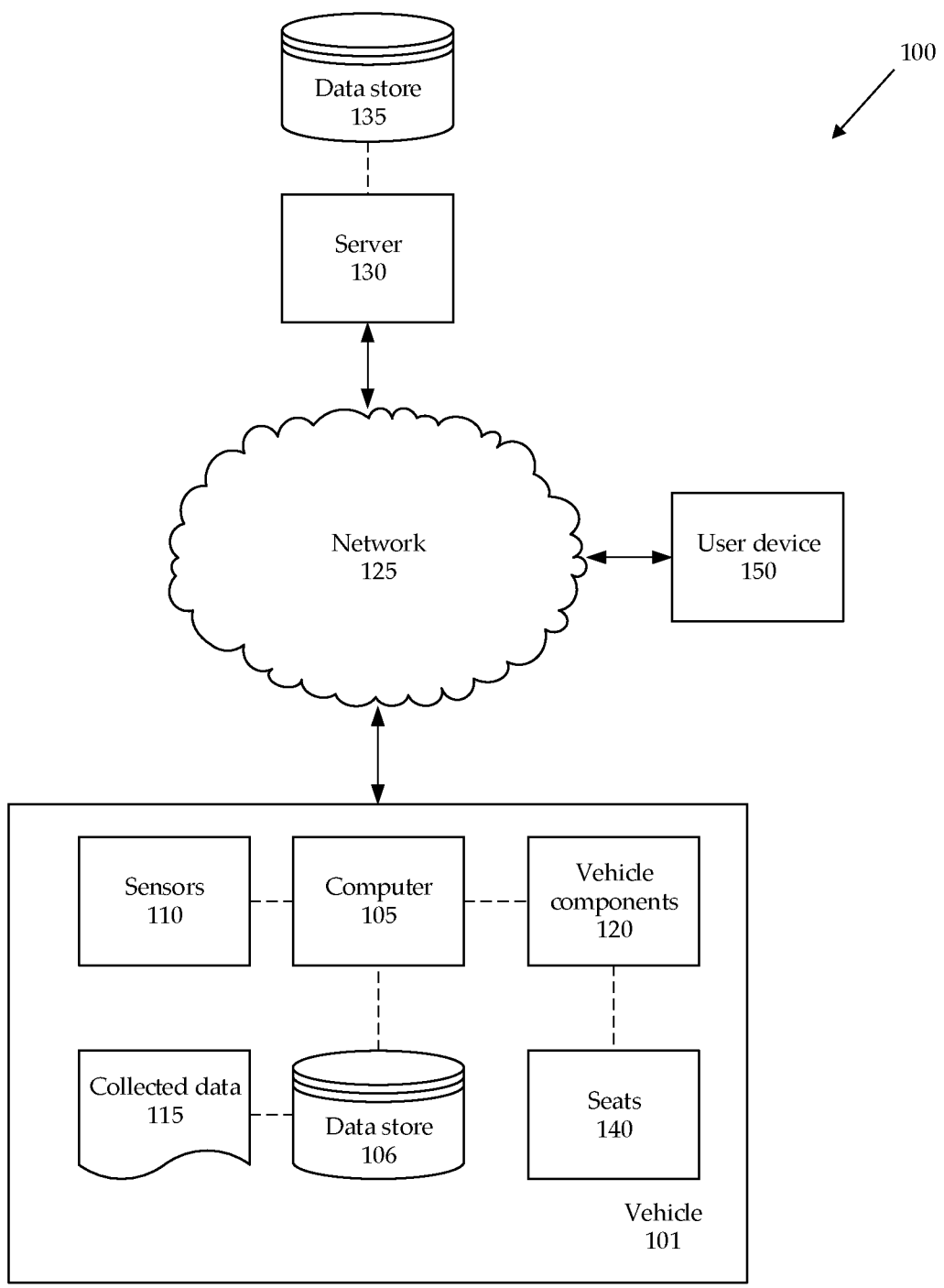
FIG. 1 is a block diagram of an example system for moving seats in a vehicle.

A system includes a computer programmed to identify a user destination based on received location information from a user, assign to the user a first seat in a vehicle based on the user destination, and move at least one of the first seat and a second seat in the vehicle upon user entry until a distance between the first seat and the second seat is greater than a distance threshold.

The computer can be further programmed to move a third seat in the vehicle upon user entry.

The computer can be further programmed to assign a plurality of respective seats to each of a plurality of users.

The computer can be further programmed to move the second seat along a track in the vehicle.

The computer can be programmed to compare the user destination with a second destination of a second user and to assign the first seat next to a seat of the second user when the destination and the second destination are within a distance threshold.

The computer can be further programmed to move the first seat and the second seat to respective original positions upon closing of a vehicle door.

The computer can be further programmed to move at least one of the first seat and the second seat from respective original positions upon detecting a user device of the user entering the vehicle and to move at least one of the first seat and the second seat to the respective original positions upon detecting the user device within a distance threshold of the first seat.

The first seat can include an occupancy sensor and the computer can be further programmed to, upon detecting the user with the occupancy sensor, move at least one of the first seat and the second seat.

The computer can be further programmed to stop the vehicle at a plurality of predetermined stops and to assign the first seat based on one of the predetermined stops.

The computer can be further programmed to determine a clearance distance and to move the second seat until the distance between the first seat and the second seat is at least the clearance distance.

A method includes identifying a user destination based on received location information from a user, assigning to the user a first seat in a vehicle based on the user destination, and moving at least one of the first seat and a second seat in the vehicle upon user entry until a distance between the first seat and the second seat is greater than a distance threshold.

The method can further include moving a third seat in the vehicle upon user entry.

The method can further include assigning a plurality of respective seats to each of a plurality of users.

The method can further include moving the second seat along a track in the vehicle.

The method can further include comparing the user destination with a second destination of a second user and assigning the first seat next to a seat of the second user when the destination and the second destination are within a distance threshold.

The method can further include moving at least one of the first seat and the second seat to respective original positions upon closing of a vehicle door.

The method can further include moving at least one of the first seat and the second seat from respective original positions upon detecting a user device of the user entering the vehicle and moving at least one of the first seat and the second seat to the respective original position upon detecting the user device within a distance threshold of the first seat.

The first seat can include an occupancy sensor, and the method can further include, upon detecting the user with the occupancy sensor, moving at least one of the first seat and the second seat.

The method can further include stopping the vehicle at a plurality of predetermined stops and to assign the first seat based on one of the predetermined stops.

The method can further include determining a clearance distance and moving the second seat until a distance between the first seat and the second seat is at least the clearance distance.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

FIG. 1 illustrates an example system 100 for moving seats in a vehicle 101 to accommodate user ingress and egress. A computer 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle 101 includes a plurality of movable seats 140. The seats 140 can support users in the vehicle 101. The computer 105 can actuate the seats 140 to move from a first position to a second position to allow ingress and egress of the users. When the users finish entering and exiting the vehicle 101, the computer can actuate the seats 140 from the second position to the first position prior to moving to the next destination.

The system 100 can include a user device 150. As used herein, a "user device" is a portable, computing device that includes a memory, a processor, a display, and one or more input mechanisms, such as a touchscreen, buttons, etc., as well as hardware and software for wireless communications such as described herein. Accordingly, the user device 150 may be any one of a variety of computing devices including a processor and a memory, e.g., a smartphone, a tablet, a personal digital assistant, etc. the user device 150 may use the network 125 to communicate with the vehicle computer 105. For example, the user device 150 and computer 105 can be communicatively coupled to each other with wireless technologies such as described above.

Figure 2:
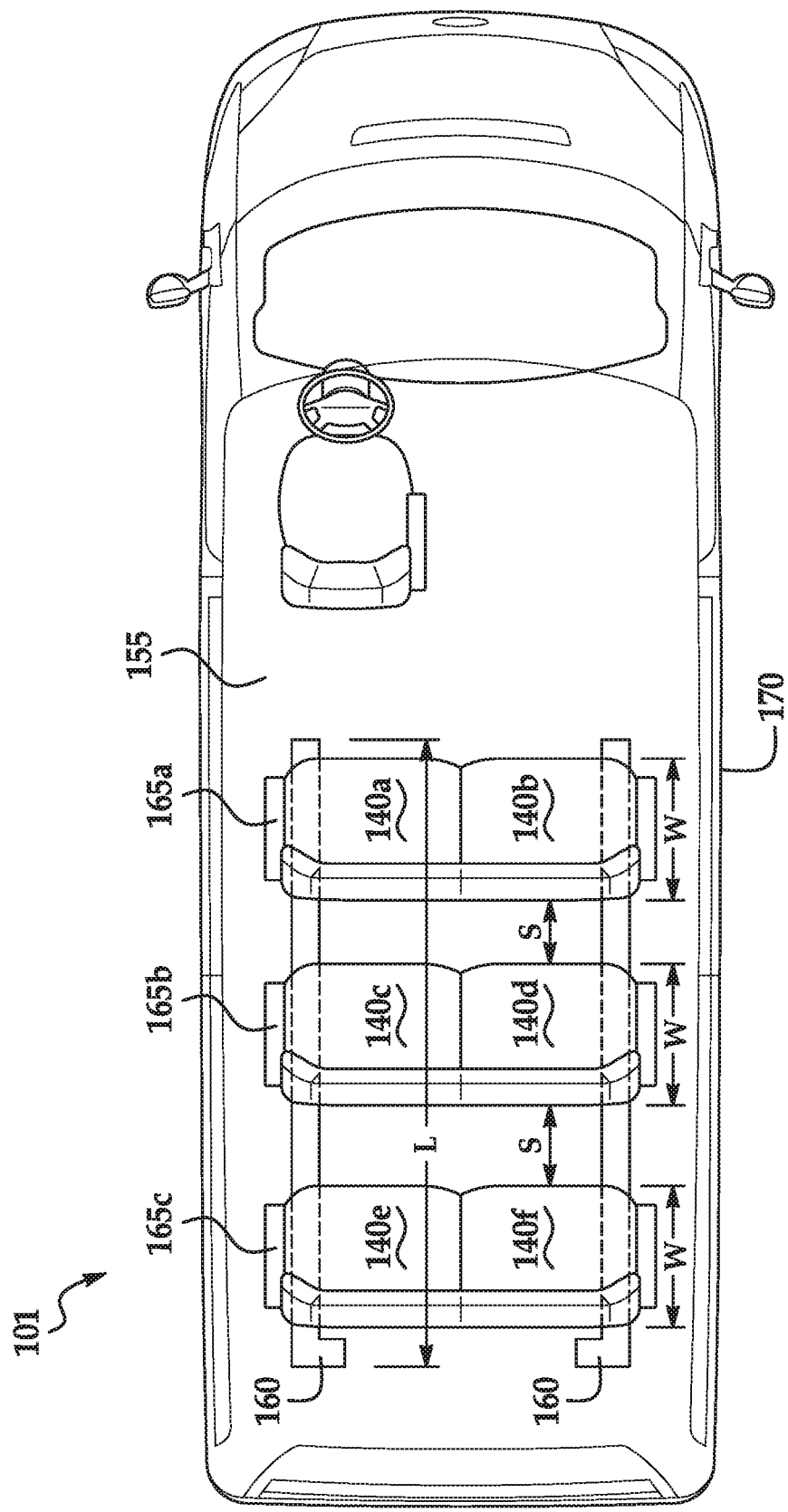
FIG. 2 is a plan view of an example vehicle with a plurality of seats.

FIG. 2 illustrates an example vehicle 101. The vehicle 101 can be an autonomous service vehicle 101 for transporting users to their respective destinations. The vehicle 101 includes a plurality of seats 140, shown as seats 140a, 140b, 140c, 140d, 140e, 140f in FIGS. 2-3. The example vehicle 101 of FIGS. 2-3 includes 6 seats 140a-140f, and the vehicle 101 can alternatively include a different number of seats 140.

The vehicle 101 can include a vehicle floor 155. The vehicle floor 155 can support the users in the vehicle 101 cabin. The vehicle floor 155 can present a class-A surface, e.g., a fabric layer such as carpet, a polymer layer, etc. The seats 140 can be movable relative to the vehicle floor 155.

The vehicle 101 can include a track 160. The seats 140 can move along the track 160 in a conventional manner. The track 160 can be installed in the vehicle floor 155. Upon receiving the destination for the user, the computer 105 can move the seats 140 along the track 160 to expedite ingress and egress of the user. The seats 140 can each include a moving mechanism (not shown), e.g., a motor connected to a wheel disposed in the track 160, that the computer 105 can actuate to move the seats 140 along the track 160.

Figure 3:
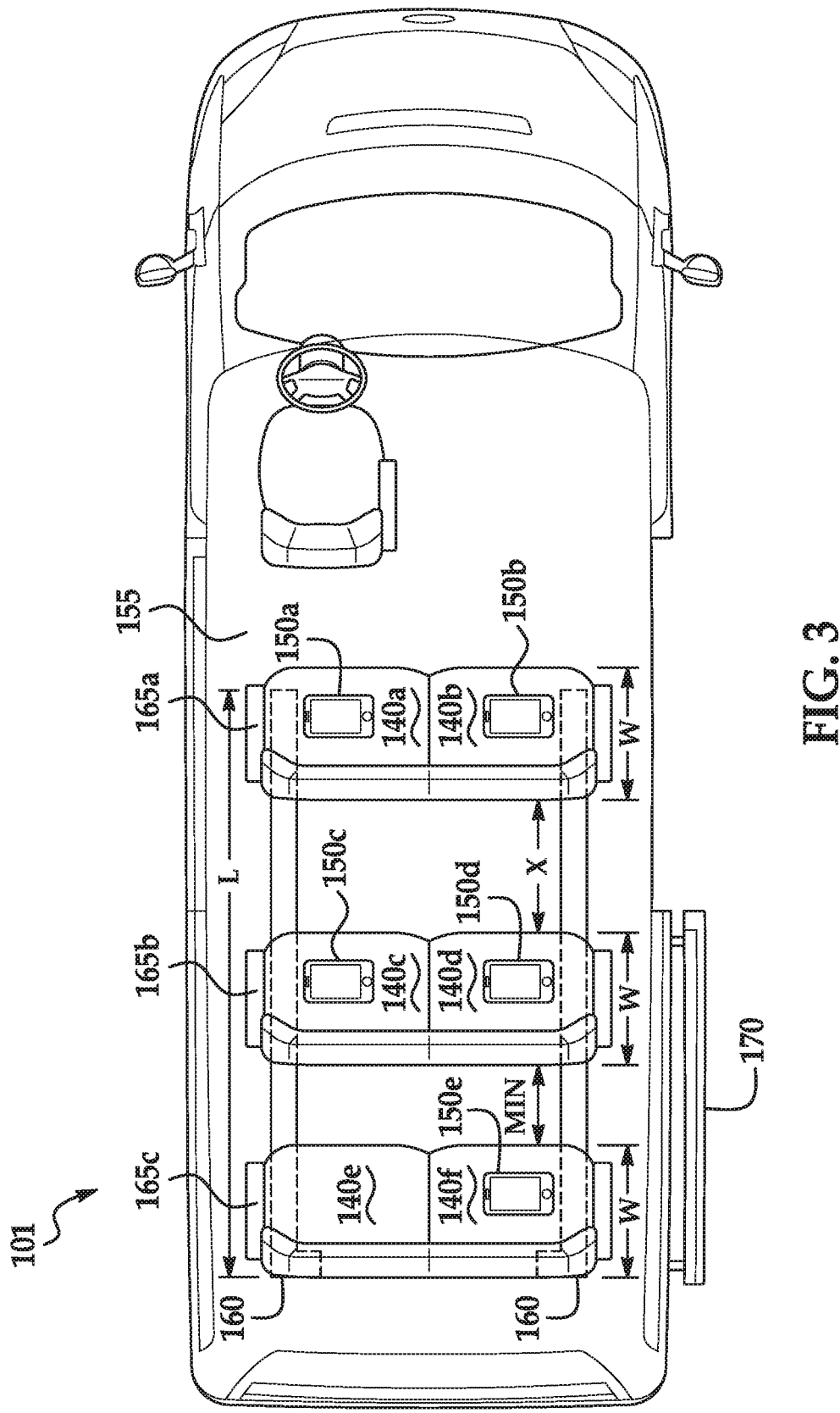
FIG. 3 is a plan view of the example vehicle of FIG. 2 with the seats moved to allow ingress and egress.

The seats 140 can be disposed on benches 165. A bench 165 can include a plurality of seats 140, moving the seats 140 together along the track 160. By including more than one seat 140 on each bench 165, the computer 105 can move more seats 140 with fewer parts to actuate. Each bench 165 can extend across the vehicle 101 cabin. The computer 105 can assign seats 140 on a single bench 165 to a single destination so that when the vehicle 101 arrives at the destination, only the single bench 165 will require clearance for the users in the seats 140 on the bench 165, and the other benches 165 can be moved to increase clearance for the single bench 165. The example of FIGS. 2-3 includes three benches 165a, 165b, 165c. Each of the benches 165a, 165b, 165c includes two seats 140 in the example of FIGS. 2-3, i.e., the seats 140a, 140b are on the bench 165a, the seats 140c, 140d are on the bench 165b, and the seats 140e, 140f are on the bench 165c. The example of FIGS. 2-3 shows each bench 165 with two seats 140, and the bench 165 can be constructed to accommodate a different number of seats 140. Alternatively, each seat 140a-140f can be separately movable along the track 160.

The computer 105 can determine a destination for a user based on location data 115 provided by the user. The user can input location data 115, i.e., a desired destination, into a user device 150. The user device 150 can communicate with the computer 105 and/or the server 130 over the network 125 to provide the location, e.g., in the form of geo-coordinates. The computer 105 can compare the location identified by the user to roadways near the location and identify a parking location on the roadways that is closest to the user's location, i.e., the user destination. Alternatively or additionally, the computer 105 can compare stops on a predetermined route (i.e., predetermined locations for the vehicle 101 to stop to load and unload users) followed by the vehicle 101 and identify the stop closest to the user's location as the user destination. Upon arriving at the stop, the computer 105 can be programmed to actuate one or more components 120, e.g., a brake, to stop the vehicle 101 at the stop.

The computer 105 can assign seats 140 to users in the vehicle 101 based on respective destinations of the users. The user device 150 of the user can send location information to the computer 105 over the network 125. Upon receiving the location information for all users, the computer 105 can determine respective destinations for all the users, and can assign respective seats 140 to each of a plurality of users according to the respective destinations of the users. For example, if two users are going to the same destination (or the destinations are within a distance threshold), the computer 105 can assign seats 140 on the same bench 165 to both users, e.g., the computer 105 can assign the seats 140c, 140d on the bench 165b to users going to the same destination or to destinations within a distance threshold of each other.

As used herein, the directions "forward" and "backward" refer to the position of a bench 165 relative to the vehicle 101. A bench 165 is "forward" of a second bench 165 when the bench 165 is closer to a front end of the vehicle 101 than the second bench 165. For example, as shown in FIG. 2, the bench 165a is "forward" relative to the benches 165b, 165c, and the bench 165b is "forward" relative to the bench 165c. A bench 165 is "backward" of a second bench 165 when the bench 165 is closer to a rear end of the vehicle than the second bench 165. For example, as shown in FIG. 2, the bench 165c is "backward" relative to the benches 165a, 165b, and the bench 165b is "backward" relative to the bench 165a. Furthermore, a "most forward" bench 165 is the bench 165 closest to the front end of the vehicle 101, a "most backward" bench 165 is the bench 165 closest to the rear end of the vehicle 101. Further still, a "next forward" bench 165 relative to a current bench 165 is a bench 165 immediately forward of the current bench 165, and a "next backward" bench 165 relative to the current bench 165 is a bench 165 immediately backward of the current bench 165.

The vehicle 101 includes at least one door 170. The door 170 can move from a closed position (as shown in FIG. 2) to an opened position at the destination (as shown in FIG. 3), allowing users to enter and exit the vehicle 101 cabin. As described below, the computer 105 can move the benches 165a, 165b, 165c upon detection of the door 170 in the closed position. Upon closing the door 170, the computer 105 can return the benches 165 to their respective original positions prior to opening the door 170 at the destination.

The computer 105 can actuate the benches 165 to move based on a position of the user device 150 relative to the door 170 and the assigned seat 140. Upon assigning the seat 140 to the user, the computer 105 can, based on data 115 collected by the sensors 110, move the bench 165 with the assigned seat 140 from an original position prior to arriving at the destination upon detecting the user device 150 of the user entering the vehicle 101 to aid ingress of the user. The computer 105 can move the bench 165 with the assigned seat 140 to the original position upon detecting the user device 150 within a distance threshold of the assigned seat 140.

FIG. 3 illustrates the computer 105 moving the benches 165 to accommodate users. The computer 105 can identify one of the seats 140 for a user about to enter the vehicle 101 or about to leave the vehicle 101. For example, the computer 105 can identify that the user in the seat 140c will exit the vehicle 101 at the upcoming destination and that a new user is going to the same destination as the user in the seat 140d. Thus, the computer 105 can move the bench 165b at the destination to allow the current user in the seat 140c to exit the vehicle 101 and assign the seat 140c to the new user entering the vehicle 101. In the example of FIG. 3, the user devices 150a, 150b, 150c, 150d, 150e indicate users in the vehicle 101.

The computer 105 can move the benches 165 when the vehicle 101 has no passengers, e.g., at a start of a service period. The computer can determine the number of benches 165, represented by the variable B, a length L of the track 160, and a width W of each bench 165. The computer 105 can determine a length of empty space E in the vehicle 101 cabin:

$$E = L - BW \quad (1)$$

The computer 105 can determine the space S between the benches 165 when no occupants are in the vehicle 101:

$$S = \frac{E}{B-1} \quad (2)$$

The computer 105 can move each bench 165 to a starting position prior to any users entering the vehicle 101, as shown in FIG. 2. The computer 105 can move the last bench 165 (the bench 165c in the example of FIGS. 2-3) to a predetermined position from the vehicle 101 rear end. The computer 105 can then move each successive bench 165 a distance of S+W away from the position of the previous bench 165. Thus, all of the benches 165 can be spaced apart a distance S prior to users entering the vehicle 101.

The computer 105 can adjust the benches 165 for users about to enter or leave the vehicle 101, as shown in FIG. 3. The computer 105 can identify the bench 165 including the seat 140 of the user about to enter or leave the vehicle 101 with, e.g., a camera 110 installed in the vehicle 101 cabin. The computer 105 can use a predetermined minimum distance MIN stored in the data store 106 and/or the server 130. The computer 105 can be programmed to move any two benches 165 no closer than the minimum distance MIN.

The computer 105 can identify the number $B_{stay}$ of benches 165 having no users entering or leaving at the destination. For each bench 165 where no users are entering or leaving, the computer 105 can reduce the distance in front of those benches 165 to MIN because no users need additional space for ingress or egress. For each bench 165 where at least one user is entering or leaving the vehicle 101, the computer 105 can move the benches 165 to allow a clearance distance X to help ingress and egress for the users. The computer 105 can identify the clearance distance X based on the total empty space E and the number $B_{stay}$ of benches 165 where at least one user is entering or leaving the vehicle 101:

$$E = B_{stay} \cdot \text{MIN} + (B - B_{stay})X \quad (3)$$

The computer 105 can solve for the clearance distance X in Equation (3). Upon determining the clearance distance X, the computer 105 can move the benches 165 to aid ingress and egress of users. The computer 105 can identify each bench 165 where no user is entering or leaving the vehicle 101 and move each bench 165 toward the next forward bench 165 until the distance between the bench 165 and the next forward bench 165 is MIN. Then, the computer 105 can move each remaining bench 165 backward until the distance between each remaining bench 165 and the next forward bench 165 is X. If moving one of the remaining benches 165 backward would reduce the distance between the next backward bench 165 to below MIN, the computer 105 can move the next backward bench 165 so that the distance between the bench 165 and the next backward bench 165 is at least MIN.

The computer 105 can send a notification to the user devices 150 of users in the seats 140 exiting the vehicle 101 at the destination to indicate the order that the users should exit the vehicle 101. Upon moving the benches 165 to allow egress of the vehicle 101, the computer 105 can send a notification to users in the most forward bench 165 that are exiting the vehicle 101 to exit the vehicle 101. The computer 105 can then send a notification to the user devices 150 of users in the next backward bench 165 to exit the vehicle 101, continuing to send the notification to users in the next backward benches 165 until all users scheduled to exit the vehicle 101 at the destination have left the vehicle 101. The computer 105 can determine that the users have left the vehicle 101 based on user occupancy sensors 110, e.g., a camera, a weight sensor, a transducer, etc.

When all of the users have entered and left the vehicle 101 at the destination, the computer 105 can determine an operating clearance distance Y. Prior to moving the vehicle 101 to the next destination, the computer 105 can move the benches 165 so that benches 165 with at least one occupant can be spaced from the next forward bench 165 by the operating clearance distance Y and benches with no users can be spaced from the next forward bench 165 by the minimum distance MIN. The computer 105 can identify a number $B_{empty}$ of benches 165 having no users. The computer 105 can determine the operating clearance distance Y as according to the following:

$$E = B_{empty} \cdot \text{MIN} + (B - B_{empty})Y \quad (4)$$

The computer 105 can solve for the operating clearance distance Y in Equation (4). The computer 105 can move each bench 165 with no users toward the next forward bench 165 until the distance between the bench 165 and the next forward bench 165 is MIN. The computer 105 can then move each remaining bench 165 so that the distance between each remaining bench 165 and the next forward bench 165 is Y. If moving one of the remaining benches 165 would reduce the distance between the next backward bench 165 to below MIN, the computer 105 can move the next backward bench 165 so that the distance between the bench 165 and the next backward bench 165 is at least MIN. The computer 105 can then move the vehicle 101 to the next destination.

Figure 4:
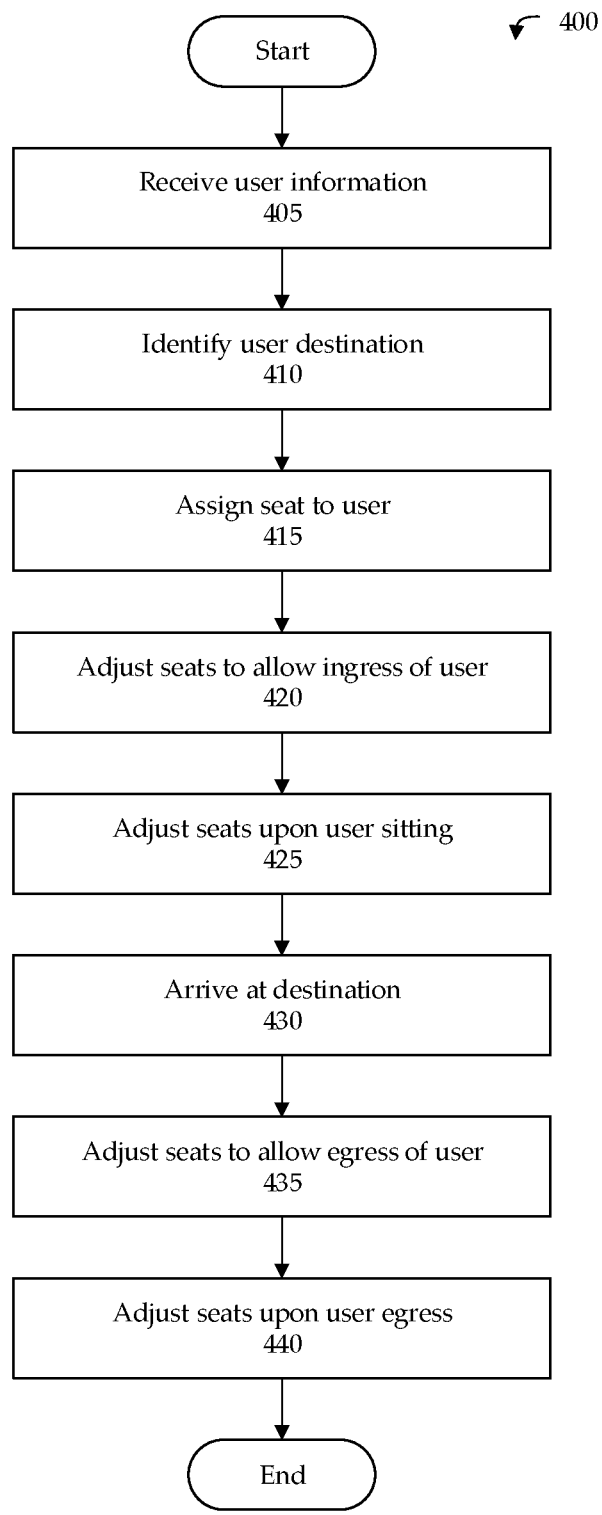
FIG. 4 illustrates an example process for assigning and moving seats in the vehicle.

FIG. 4 illustrates an example process 400 for moving seats 140 for users in a vehicle 101. The process 400 begins in a block 405, in which the computer 105 receives user information over the network 125 from a user device 150. The user can input a location into the user device 150, and the user device 150 can communicate with the computer 105 over the network 125.

Next, in a block 410, the computer 105 identifies a user destination based on the user information provided by the user device 150. The computer 105 can compare the location identified by the user to one or more roadways within a distance threshold the location and identify a parking location on the roadways that is closest to the user's location, i.e., the user destination. The computer 105 can identify roadways based on, e.g., known path-determining techniques based on geo-coordinates. Alternatively or additionally, the computer 105 can compare stops on a predetermined route (i.e., predetermined stops) followed by the vehicle 101 and identify the stop closest to the user's final location as the user destination.

Next, in a block 415, the computer 105 assigns a seat 140 to the user. The computer 105 can compare the user destinations of the users in the vehicle 101 to the new user destination and can assign the seat 140 based on the proximity of the user destinations, i.e., a distance between the user destinations. For example, the new user destination can be within a distance threshold of a user destination of one of the other users in the vehicle 101, a "first user" in this example. The computer 105 can assign the seat 140 to the new user that is on the same bench 165 as the first user. Thus, because the first user and the new user will be exiting the vehicle at the same user destination or at user destination within a distance threshold, the computer 105 can move the benches 165 to accommodate only the bench 165 with the new user and the first user. As shown in FIG. 3, the computer 105 can assign the seat 140c to the new user having the same destination as the first user in the seat 140d. By assigning the new user to the seat 140 on the same bench 165 as the first user, the computer 105 can reduce the number of benches 165 to move at the destination, reducing the time spent for ingress and egress of the users and increasing the space in front of the bench 165 to accommodate the users entering and exiting the vehicle 101.

Next, in a block 420, the computer 105 adjusts the benches 165 according to the assigned seat 140. Upon arriving at the user destination and opening the vehicle door 170, the computer 105 can adjust the benches 165 in front of the bench 165 with the assigned seat 140 to provide a clearance distance for ingress of the user. Alternatively or additionally, the computer 105 can move the assigned bench 165 and the benches 165 behind the assigned bench 165 to provide the clearance distance for the user while providing legroom for the other benches with users. As shown in FIG. 3, the computer 105 can move the benches 165a, 165b, 165c so that the bench 165b has clearance distance X for users in the seats 140c, 140d.

Next, in a block 425, the computer 105 adjusts the benches 165 when a user sits in the seat 140. The seat 140 can include a user occupancy sensor that detects the user sitting in the seat 140. For example, the user occupancy sensor can be a weight sensor that detect the user when the weight sensor detects a weight above a weight threshold. In another example, the user occupancy sensor can be a camera that detect the user upon detecting an image of the user in the seat 140. When the user is seated in the seat 140, the computer 105 can adjust the benches 165 until the assigned bench 165 has less than the operating clearance distance Y between the assigned bench 165 and the next bench 165. Alternatively or additionally, once the user no longer requires additional room for ingress, the computer 105 can return the benches 165 to their original positions, e.g., as shown in FIG. 2.

Next, in a block 430, the computer 105 determines that the vehicle 101 has arrived at the user destination determined in the block 410. The computer 105 can use geo-location data 115 to determine that the vehicle 101 is at the destination determined from the user location information.

Next, in a block 435, the computer 105 adjusts the seats 140 to allow egress of the users at the destination. As described above, the computer 105 can move the benches 165 to allow the clearance distance X for the users to exit the vehicle 101. For example, as shown in FIG. 3, the computer 105 can move the benches 165a-165c to allow users in the seats 140c, 140d to exit the vehicle 101.

Next, in a block 440, the computer 105 can adjust the seats 140 upon detecting that the users have left the vehicle 101. As described above, the computer 105 can identify a location of the user device 150 relative to the vehicle door 170 to determine whether the user has left the vehicle 101. Upon detecting that the users have left the vehicle 101, the computer 105 can adjust the benches 165 to allow the clearance distance Y for the remaining users. Following the block 440, the process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer programmed to:
    identify a user destination based on received location information from a user;
    assign to the user a first seat in a vehicle based on the user destination; and
    move at least one of the first seat and a second seat in the vehicle upon user entry until a distance between the first seat and the second seat is greater than a distance threshold,
    wherein the computer is further programmed to compare the user destination with a second destination of a second user and to assign the first seat next to a seat of the second user when the user destination and the second destination are within a distance threshold.

2. The system of claim 1, wherein the computer is further programmed to move a third seat in the vehicle upon user entry.

3. The system of claim 1, wherein the computer is further programmed to assign a plurality of respective seats to each of a plurality of users.

4. The system of claim 1, wherein the computer is further programmed to move the second seat along a track in the vehicle.

5. The system of claim 1, wherein the computer is further programmed to move the first seat and the second seat to respective original positions upon closing of a vehicle door.

6. The system of claim 1, wherein the computer is further programmed to move at least one of the first seat and the second seat from respective original positions upon detecting a user device of the user entering the vehicle and to move at least one of the first seat and the second seat to the respective original positions upon detecting the user device within a distance threshold of the first seat.

7. The system of claim 1, wherein the first seat includes an occupancy sensor and the computer is further programmed to, upon detecting the user with the occupancy sensor, move at least one of the first seat and the second seat.

8. The system of claim 1, wherein the computer is further programmed to stop the vehicle at a plurality of predetermined stops and to assign the first seat based on one of the predetermined stops.

9. The system of claim 1, wherein the computer is further programmed to determine a clearance distance and to move the second seat until the distance between the first seat and the second seat is at least the clearance distance.

10. A method, comprising:
   identifying a user destination based on received location information from a user;
   assigning to the user a first seat in a vehicle based on the user destination;
   moving at least one of the first seat and a second seat in the vehicle upon user entry until a distance between the first seat and the second seat is greater than a distance threshold; and
   comparing the user destination with a second destination of a second user and assigning the first seat next to a seat of the second user when the user destination and the second destination are within a distance threshold.

11. The method of claim 10, further comprising moving a third seat in the vehicle upon user entry.

12. The method of claim 10, further comprising assigning a plurality of respective seats to each of a plurality of users.

13. The method of claim 10, further comprising moving the second seat along a track in the vehicle.

14. The method of claim 10, further comprising moving at least one of the first seat and the second seat to respective original positions upon closing of a vehicle door.

15. The method of claim 10, further comprising moving at least one of the first seat and the second seat from respective original positions upon detecting a user device of the user entering the vehicle and moving at least one of the first seat and the second seat to the respective original position upon detecting the user device within a distance threshold of the first seat.

16. The method of claim 10, wherein the first seat includes an occupancy sensor and the method further includes, upon detecting the user with the occupancy sensor, moving at least one of the first seat and the second seat.

17. The method of claim 10, further comprising stopping the vehicle at a plurality of predetermined stops and to assign the first seat based on one of the predetermined stops.

18. The method of claim 10, further comprising determining a clearance distance and moving the second seat until a distance between the first seat and the second seat is at least the clearance distance.

\* \* \* \* \*